United States Patent [19]

Parsons

[11] Patent Number: 4,674,361
[45] Date of Patent: Jun. 23, 1987

[54] MECHANISM FOR TRANSMITTING ROTATIONAL MOTION FROM ONE SHAFT TO ANOTHER

[75] Inventor: Bryan N. V. Parsons, Stoney Stanton, United Kingdom

[73] Assignee: Jaguar Cars Limited, Coventry, England

[21] Appl. No.: 746,735

[22] Filed: Jun. 20, 1985

[30] Foreign Application Priority Data

Jun. 21, 1984 [GB] United Kingdom ............... 8415908

[51] Int. Cl.$^4$ ............................................. F16H 1/28
[52] U.S. Cl. .................................. 74/804; 74/567
[58] Field of Search .................. 74/804, 805, 801, 567

[56] References Cited

U.S. PATENT DOCUMENTS

| | | | |
|---|---|---|---|
| 946,253 | 1/1910 | Moore | 74/804 |
| 3,876,100 | 4/1975 | Brudi et al. | 74/804 X |
| 3,886,805 | 6/1975 | Koderman | 74/804 X |
| 4,059,371 | 11/1977 | Sheldon | 74/804 X |
| 4,063,710 | 12/1977 | Minami et al. | 74/805 X |
| 4,243,355 | 1/1981 | Brudi et al. | 74/804 X |
| 4,351,204 | 9/1982 | Ross | 74/804 |
| 4,368,011 | 1/1983 | Woodling | 74/804 X |
| 4,520,693 | 6/1985 | Sfredda | 74/804 |

FOREIGN PATENT DOCUMENTS

| | | | |
|---|---|---|---|
| 719147 | 2/1932 | France | 74/804 |
| 197766 | 5/1923 | United Kingdom | 74/804 |

Primary Examiner—Allan D. Herrmann
Assistant Examiner—Joseph M. Rolnicki
Attorney, Agent, or Firm—Solon B. Kemon

[57] ABSTRACT

A mechanism for transmitting rotational motion from a drive shaft such as a crankshaft of an engine to one or more parallel shafts such as camshafts comprising a triangular link connected to the crankshaft by an eccentric crank and connected to the camshafts by internal gears which engage with sprockets connected to the camshafts. The gear ratio between the crankshaft and camshafts is determined by the radii of the internal gears and the sprockets. The link can also be used to drive auxiliary components such as an alternator or a water pump, or to transmit drive from a starter motor to the crankshaft when the engine is started.

11 Claims, 10 Drawing Figures

MECHANISM FOR TRANSMITTING ROTATIONAL MOTION FROM ONE SHAFT TO ANOTHER

BACKGROUND OF THE INVENTION

This invention relates to a mechanism for transmitting rotational motion from one shaft to another.

Belt or chain drives are generally used to transmit rotational motion from one shaft to another, eg from a crankshaft of an internal combustion engine to a camshaft thereof. However, such drive mechanisms tend to wear and can become noisy. Torque fluctuations also set up vibrations in the chain or belt and this increases wear. Tensioning devices and damper strips are used to alleviate these problems but these complicate the mechanism, reduce its efficiency and can create additional noise. It is also often necessary for the driven shaft to rotate at a precise fraction of the speed of the driving shaft and to maintain a constant phase relationship therewith. Any free-play in the mechanism due to wear or slackness makes it difficult to maintain these relationships.

SUMMARY OF THE INVENTION

According to this invention there is provided a mechanism for transmitting rotational motion from one shaft to another comprising: a link member mounted at three non-linear points on a support so as to be moveable in an orbital manner with respect to the support but constrained against rotation relative thereto; a first shaft drivingly connected to the link member such that rotation of the first shaft causes the link member to undergo orbital movement with with respect to the support; a first gear fixed to the link member so as to undergo orbital movement therewith; and a second shaft, lying parallel to the first shaft, drivingly connected to the first gear such that orbital movement of the link member causes the second shaft to rotate at a speed different to that of the first shaft.

Preferred features of the invention will be apparent from the subordinate claims of the specification.

BRIEF DESCRIPTION OF THE DRAWINGS

The invention will now be described, merely by way of example, with reference to the accompanying drawings, in which.

DESCRIPTION OF A PREFERRED EMBODIMENT

The invention will be illustrated by describing its use in an internal combustion engine to transmit rotational motion from a crankshaft to one or more camshafts and to other auxiliary components.

Figure 1:
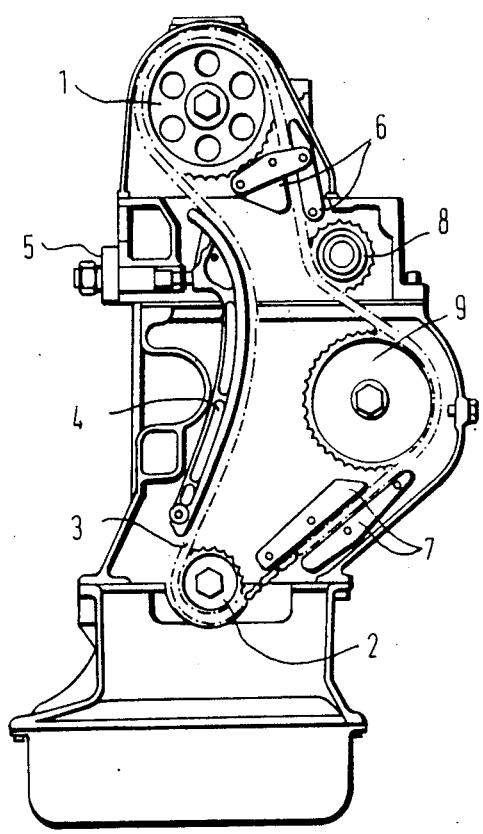
FIG. 1 shows a convention overhead cam chain drive of an internal combustion engine.

FIG. 1 shows a conventional arrangement in which a camshaft gear 1 is driven by a crankshaft gear 2 by means of a chain drive. The chain 3 passes around a tensioning rail 4, a tensioner 5, and between slide rails 6 and 7. The chain also passes around a guide wheel 8 and an intermediate sprocket 9 which may, for example, drive a fuel injection timer.

Figure 2:
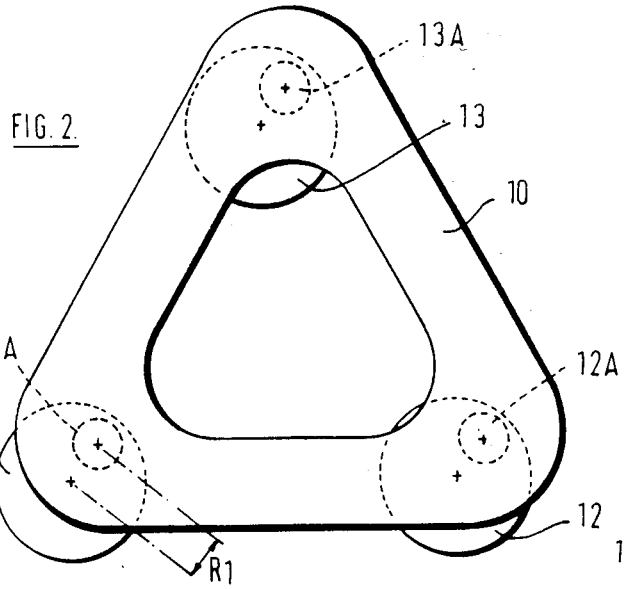
FIG. 2 shows a link to illustrate the manner in which drive is transmitted from one shaft to another in this invention.

FIG. 2 shows a simple triangular link 10 for transmitting rotational motion from a first shaft 11 to a second shaft 12 which is parallel with the first shaft 11. The shafts 11 and 12 respectively carry eccentric cranks 11A and 12A which are pivotably connected to respective corners of the link 10. An idler shaft 13 with a similar crank 13A is provided at the third corner of the link 10. As will be appreciated from the following description, the idler shaft 13 is required to ensure that the mechanism can transmit torque when the shafts 11 and 12 and their cranks 11A and 12A are arranged in a straight line.

Rotation of the shaft 11 with its crank 11A causes the link 10 to undergo orbital motion in which each part of the link, eg the axis of the crank 11A, moves around a circle having a radius R which corresponds with the distance between the axes of the crank 11A and the shaft 11. The shafts 12 and 13 and their respective cranks 12A and 13A are, of course, also arranged to be offset from each other by the distance R and in a direction parallel to the offset between the shaft 11 and its crank 11A. It will be appreciated that during the orbital motion the link 10 remains in the same orientation with respect to the shafts 11, 12 and 13, ie it does not rotate wih respect to the shafts. All parts of the link 10 thus move with the same velocity as each other.

The orbital motion of the link 10 causes the crank 12A to move around the axis of the shaft 12 and thus rotate this shaft. It will be appreciated that the shafts can be connected to the link by their cranks in any arrangement and that further shafts can be connected by eccentric cranks to the link so long as there are always at least three cranks which are connected to the link at three non-linear points.

Figure 3:
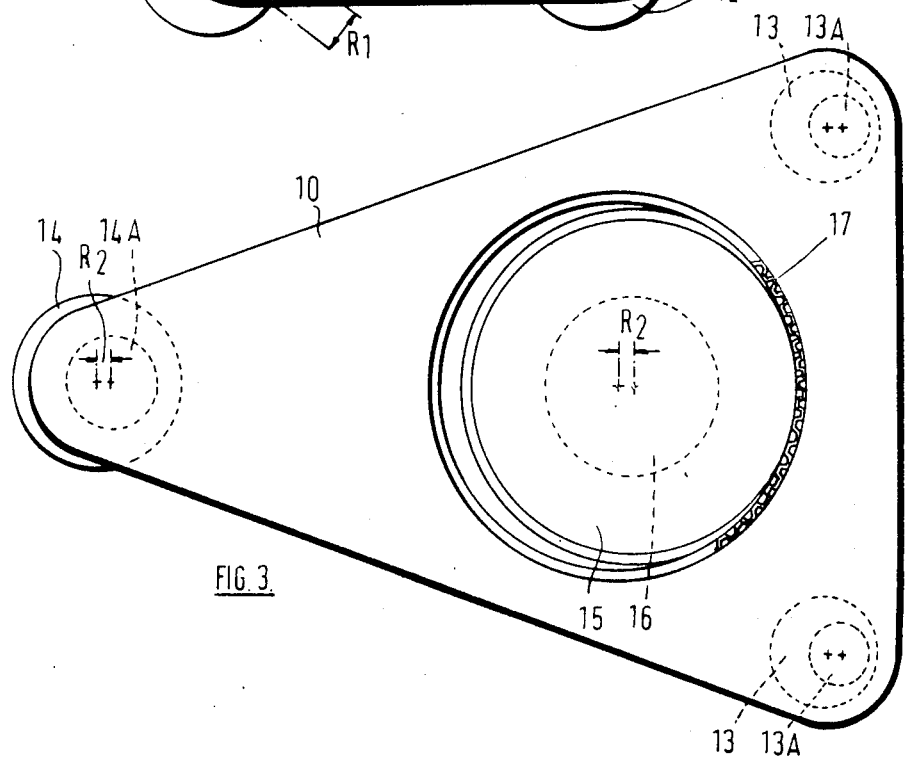
FIG. 3 shows a link as used in one emboidment of a mechanism according to this invention.
Figure 2A:
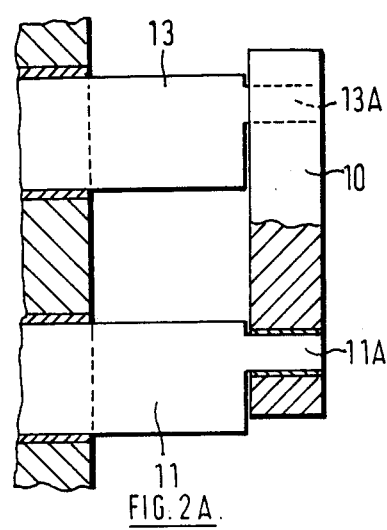
FIG. 2A shows a sectional elevation along the line A—A in FIG. 2.
Figure 3A:
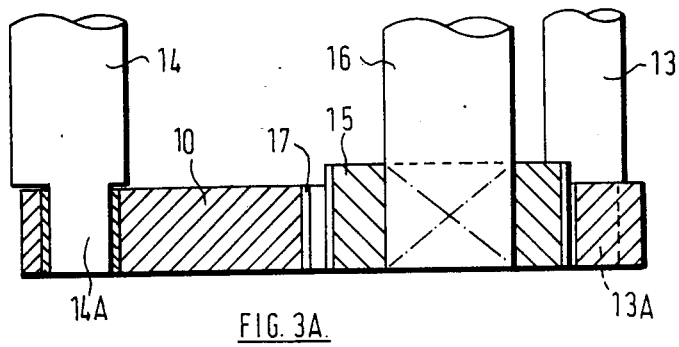
FIG. 3A shows a sectional plan view along the line A—A in FIG. 3.
Figure 6:
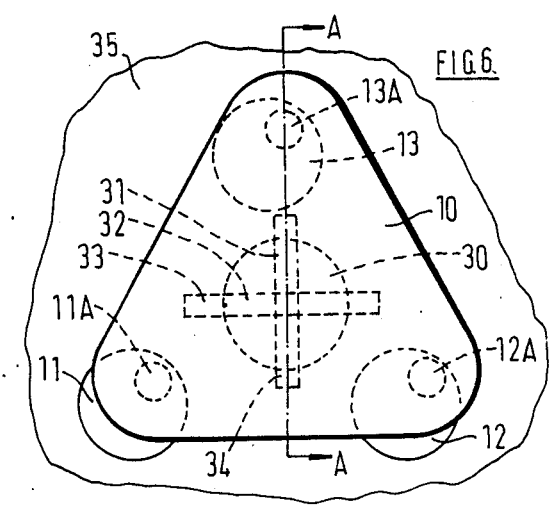
FIG. 6 shows a link constrained by means of an Oldham coupling.
Figure 6A:
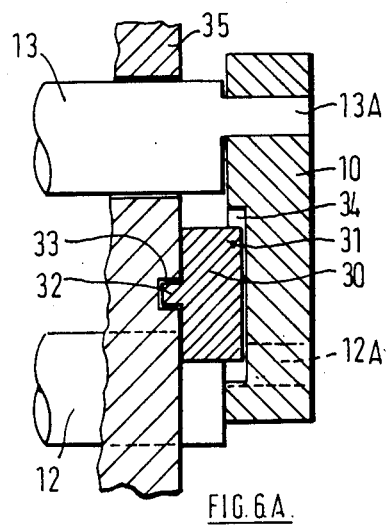
FIG. 6A is a sectional elevation along the line A—A in FIG. 6.

FIG. 3 shows the triangular link 10 used to transfer rotational motion from the drive shaft 14 of a starter motor to a sprocket 15 attached to a crankshaft 16 of an internal combustion engine. The sprocket 15 is connected to the crankshaft 16 by a one-directional roller clutch (not shown). The sprocket 15 engages with an internal gear 17 provided in the link 10. The centres of the sprocket 15 and the gear 17 are offset by a distance R2 corresponding to the offset between the shaft 14 and it eccentric crank 14A. At least one idler shaft 13 and crank 13A is be provided to constrain the link to orbital motion. Rotation of the shaft 14 causes the link 10 to undergo orbital motion and the orbital motion of the internal gear 17 causes the sprocket 15 to rotate about its axis thus transmitting drive to the crankshaft 16. The gear ratio between the drive shaft 14 of the starter motor and the crankshaft 16 is given by the formula $(c-b)/c$, where b is the radius of the internal gear 17 and c is the radius of the sprocket 15. Thus, it can be seen that with a small difference between the radii of the internal gear 17 and the sprocket 15 a large step-down is produced. On the other hand, if the radius of the sprocket 15 is much smaller than that of the internal gear 17 a large step-up is produced. In the illustrated embodiment a step-down of approximately 1:12 is obtained, ie the crankshaft 16 is rotated once every twelve rotations of the drive shaft 14 of the starter motor.

Figure 4A:
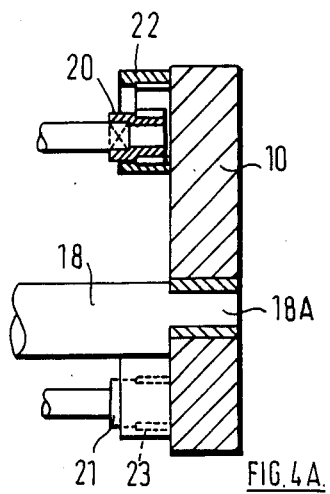
FIG. 4A shows a sectional elevation along the line A—A in FIG. 4.
Figure 4:
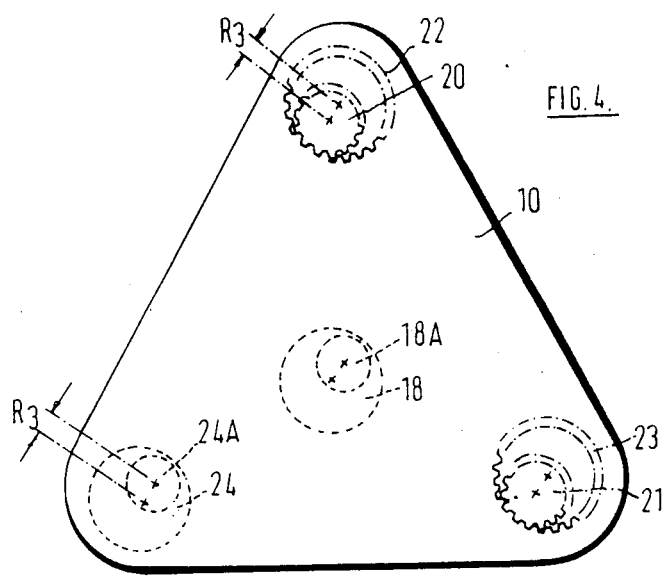
FIG. 4 shows a link as used in a second embodiment of a mechanism according to this invention.
Figure 5:
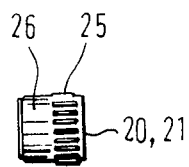
FIG. 5 shows a modified sprocket for use in the link of FIG. 4.

FIG. 4 shows a triangular link 10 used to drive two sprockets 20 and 21 which are respectively connected to two overhead camshafts (not shown) of an internal combustion engine. The sprockets 20 and 21 respectively engage with internal gears 22 and 23 fixed to the link 10. The link 10 is caused to move orbitally by a crankshaft 24 of the engine connected to the link 10 by an eccentric crank 24A and an idler shaft 18 is connected to the centre of the link 10 by a crank 18A. The centres of the sprockets 20 and 21 are offset from the centres of the gears 22 and 23 by a distance R3 corresponding to the offset between the crankshaft 24 and its crank 24A and between the idler shaft 18 and its crank 18A. In the illustrated embodiment, the sprockets 20 and 21 and gears 22 and 23 function to constrain the link 10 in orbital motion as well as rotating the camshafts (not shown). However, in a preferred embodiment the sprockets and gears are modified to provide a roller surface which bears the forces required to maintain the link in orbital motion. In this case, the sprockets 20 and 21 are substantially cylindrical in shape with gear teeth 25 around one end of the cylinder and a roller surface 26 around the other end of the cylinder, as shown in FIG. 5. The radius of the roller surface 26 corresponds to the pitch circle radius. The internal gears 22 and 23 are similarly provided with a roller surface adjacent the teeth thereof (not shown). Alternatively, further idler shafts (not shown) with eccentric cranks could be used to constrain the link in orbital motion. The idler shaft 18 and its crank 18A shown in FIG. 4 could, of course, be replaced by other means for constraining the link 10 against rotation, for instance a pin which is attached to the link 10 and is arranged to move around the outer surface of a circular projection provided on the engine or other support.

The link is particularly suitable for use in driving the camshaft(s) of an internal combustion engine as it is simple, compact, light and efficient. In addition, the 2:1 step-down required is easily provided by using sprockets with a radius ⅔ of that of the internal gears. The internal and external gear arrangement illustrated has a high efficiency and is very strong.

It is also possible to fix a sprocket to the link and arrange for this to engage with an internal gear connected to a shaft. With this arrangement the driven shaft rotates in the opposite direction as compared to the arrangement described above and the step-down gear from the link to the shaft increases as the difference between the radii of the sprocket and the gear decreases.

To further simplify the engine auxiliary components such as an alternator, water pump, cooling fan, air-conditioner compressor etc, can also be driven from the same link, with appropriate step-down gearing if required. As the link is out of balance whilst in operation, counter-balance weights are preferably fitted to the driven and driving shafts so that no vibration is transmitted to the engine.

One or more Oldham couplings can be used to constrain the link to orbital motion in place of one or more idler shafts. The coupling comprises a plate having an elongate projection on each side, the two projections being arranged at right angles to each other. One projection is slideably located in a slot provided in the link and the other in a slot provided in a support member. The coupling allows the link to move in translational motion and thus allows it to undergo orbital motion, but it prevents rotation of the link relative to the support.

Various combinations of shafts with eccentric cranks, gear and sprocket connections and Oldham couplings can be used to constrain the link against rotation but to allow it to orbit. So long as the link is suitably constrained, driving or driven shafts can be connected thereto by which ever means is most appropriate.

The link described above can, of course, be used in many applications. It can, for instance, be used to transmit drive from an engine to a gear box. The link could also form the basis of a strong and compact gear box. Indeed, the link described can be used as an alternative to most belt and chain transmissions and could be used, for example, in the drive of bicycles, motorcycles, lawnmowers or washing machines.

This invention also relates to a motor vehicle having a mechanism of the type described above.

I claim:

1. A mechanism for transmitting rotational motion from a crankshaft to a camshaft comprising: a link member mounted at three non-linear points on a support so as to be moveable in an orbital manner with respect to the support but constrained against rotation relative thereto; a crankshaft drivingly connected to the link member such that rotation of the crankshaft causes the link member to undergo orbital movement with respect to the support; a first gear fixed to the link member so as to undergo orbital movement therewith; and a camshaft, lying parallel to the crankshaft, drivingly connected to the first gear such that orbital movement of the link member causes the camshaft to rotate at a speed different to that of the crankshaft.

2. A mechanism as claimed in claim 1 in which the crankshaft is eccentrically connected to the link member by a crank.

3. A mechanism as claimed in claim 2 in which a further shaft is drivingly connected to a further gear fixed to the link member such that orbital movement of the link member causes the further shaft to rotate at a speed different to that of the first shaft.

4. A mechanism as claimed in claim 1 in which at least one idler shaft is drivingly connected to the link member.

5. A mechanism as claimed in claim 3 in which said further shaft is a further cam shaft.

6. A mechanism as claimed in claim 1 in which the crankshaft is drivingly connected to a second gear fixed to the link member and at least two further shafts are eccentrically connected to the link member by a crank.

7. A mechanism as claimed in claim 1 in which at least one Oldham coupling is provided between the link member and the support.

8. A mechanism as claimed in claim 1 in which said first gear comprises an internal gear which is drivingly connected to an external gear connected to the cam shaft.

9. A mechanism as claimed in claim 1 in which said first gear is provided with a roller surface for bearing the forces required to constrain the link member to orbital motion.

10. A mechanism as claimed in claim 1 in which at least one auxiliary shaft is drivingly connected to the link member such that orbital movement of the link member causes the auxiliary shaft to rotate, said auxiliary shaft being drivingly connected to a component from the group including an alternator, a water pump, a cooling fan and an air conditioning compressor.

11. A mechanism as claimed in claim 1 in which an auxiliary shaft is drivingly connected to the link member so that the shaft may be driven by a starter motor to cause orbital movement of the link and thus rotation of the crankshaft and camshaft.

* * * * *